United States Patent [19]
Lundgren

[11] Patent Number: 5,608,620
[45] Date of Patent: Mar. 4, 1997

[54] METHOD OF ELICITING UNBIASED FORECASTS BY RELATING A FORECASTER'S PAY TO THE FORECASTER'S CONTRIBUTION TO A COLLECTIVE FORECAST

[76] Inventor: Carl A. Lundgren, 1212 W. Jefferson, Apt. A, Springfield, Ill. 62702

[21] Appl. No.: 390,231

[22] Filed: Feb. 17, 1995

Related U.S. Application Data

[63] Continuation of Ser. No. 292,508, Aug. 18, 1994, abandoned, which is a continuation of Ser. No. 8,340, Jan. 25, 1993, abandoned, which is a continuation-in-part of Ser. No. 841,258, Feb. 24, 1992, abandoned, which is a continuation of Ser. No. 495,772, Mar. 19, 1990, abandoned.

[51] Int. Cl.⁶ ............................................. G06F 17/60
[52] U.S. Cl. ..................... 395/201; 395/211; 395/214; 395/235
[58] Field of Search ............................ 364/401, 408, 364/419.2, 401 R

*Primary Examiner*—Robert A. Weinhardt
*Attorney, Agent, or Firm*—Watts, Hoffmann, Fisher & Heinke Co.

[57] ABSTRACT

A method of eliciting an unbiased prediction of an unknown variable value from at least one of a group of forecasters. This method of compensating individual forecasters can be applied to an entire group of forecasters so as to elicit an unbiased collective prediction. The method yields nearly unbiased predictions from risk-averse forecasters whenever at least two forecasters are employed to make the same prediction. The method involves: aggregating the predictions of the forecasters, both with and without the particular prediction of the individual forecaster; computing collective losses for both of the aggregated predictions; calculating the individual forecaster's marginal contribution to predictive accuracy, based on the difference in collective losses; and computing and paying the individual forecaster's compensation as a function of the individual's marginal contribution.

21 Claims, 2 Drawing Sheets

METHOD OF ELICITING UNBIASED FORECASTS BY RELATING A FORECASTER'S PAY TO THE FORECASTER'S CONTRIBUTION TO A COLLECTIVE FORECAST

CROSS-REFERENCE TO RELATED APPLICATIONS

This application is a continuation of application Ser. No. 08/292,508, filed Aug. 18, 1994 now abandoned, which is a continuation of application Ser. No. 08/008,340 filed on Jan. 25, 1993 now abandoned, which is a continuation-in-part of application Ser. No. 07/841,258, filed Feb. 24, 1992, for A Method of Motivating Unbiased Human Predictions, now abandoned, which in turn is a continuation application of application Ser. No. 07/495,772 filed Mar. 19, 1990, also for A Method of Motivating Unbiased Human Predictions, now abandoned.

BACKGROUND OF THE INVENTION

The purpose of the invention is to elicit unbiased forecasts from a plurality of forecasters by means of monetary or other compensation. Each individual forecaster is compensated on the basis of his contribution to the accuracy of a collective prediction, which is computed from a plurality of predictions by individual forecasters. The method may be applied to obtain nearly unbiased estimates or predictions of any variable whose value is currently unknown. Examples of important variables whose value may require forecasting include the expected value of a firm's future profits, the expected price of a commodity, or the expected damage that might be caused by an environmental pollutant.

The invention is particularly focused on efficiently organizing the cost side of information collection, and even more particularly on efficiently motivating and aggregating the predictions of different forecasters. The information being collected is information about the predictions of different forecasters. By the usual law of diminishing marginal returns, after some minimum amount of information has been collected, further information collection will eventually yield decreasing marginal benefits. The optimal amount of information collection occurs when the marginal benefit equals the marginal cost within this range of decreasing marginal benefit, unless the optimal amount is zero.

Each forecaster must make his own subjective prediction of future events based on his own interpretation of objective evidence and his own evaluation of competing hypotheses. It is reasonable to suppose that each forecaster has an important contribution to make to the accuracy of the collective prediction of a group of forecasters. The simplest method of aggregating predictions is to take a mean of the individual predictions. This allows each forecaster to make his own contribution to the outcome of the collective prediction. If each submitted forecast is equally good in terms of expected accuracy, an unweighted mean is best. If some of the forecaster are better than others, a weighted mean is better. Other methods of aggregation include taking a median or computing a trimmed mean. Obviously, the principle of taking means or otherwise aggregating numbers is not new. What is new will be the method of compensating the forecasters.

How forecasters are compensated makes a considerable difference in terms of their incentive to make accurate predictions. For example, suppose we reward forecasters for predicting close to the actual realized value of a variable and penalize forecasters for predicting far away from the actual value. This would seem the most natural way of motivating forecasters to be accurate. "Proper scoring rules" which motivate risk-neutral forecasters to provide unbiased forecasts are basically an elaboration on this intuitive approach. However, when forecasters are risk averse, the use of proper scoring rules can result in biased forecasts.

Instead, the best way of motivating forecasters to make unbiased predictions is to compare each individual forecast with the collective forecast and see whether the individual prediction has moved the collective prediction towards or away from the actual value of the variable being predicted. If the individual prediction has moved the collective prediction towards the actual value, then the forecaster has made a positive contribution and should be rewarded. If the individual prediction has moved the collective prediction away from the actual value, then the forecaster has made a negative contribution and should be penalized. If desired, the rewards/penalties to the forecaster can be made proportional to the estimated marginal benefits/harms caused by the forecaster's prediction.

DESCRIPTION OF RELATED ART

Several systems of forecasting and implied systems of forecasting are known to the prior art. We shall not discuss here any system involving supposed psychic powers, fortune-telling, or other unsubstantiated forms of divination, since they are clearly irrelevant to the present invention. Likewise, we shall not discuss any particular rational, scientific, intuitive, or statistical method by which an individual might analyze data or other evidence to arrive at logical predictions. How a forecaster forecasts is of no concern to the present invention, since the method is only concerned with providing proper motivation for accurate forecasts. Nor shall we discuss methods of collecting or aggregating expert opinions, such as the Delphi method and various mathematical or statistical methods, which do not concern themselves with the problem of providing incentives for the elicitation of accurate predictions.

A method for eliciting probabilities, known as a proper scoring rule, has been much discussed in the literature, including the following:

I. Kadane, Joseph B. and Robert L. Winkler (1988). "Separating Probability Elicitations From Utilities," *Journal of the American Statistical Association*, June, vol. 83, no. 402, pp. 357–359; and II. Page, Talbot (1988). "Pivot Mechanisms as a Link between Probability and Preference Revelation," *Journal of Economic Theory*, vol. 44, pp. 43, 45–46.

A common example of a proper scoring rule is the Brier rule first proposed in 1950, which apparently received widespread adoption by weather forecasters in the 1960's. Converted to the terminology of this patent application, the score S is computed as $S=A-B(X_a-X_i)^2$, where A and B are constants, $B>0$, $X_a$ is an observation of the occurrence of an event ($X_a=1$ if event occurs; $X_a=0$ otherwise), and $X_i$ is forecaster i's predicted probability. It is noteworthy that compensation from a proper scoring rule is based solely on a forecaster's own prediction, and not on any comparison of one forecaster's prediction with other forecasters' predictions, as in the present invention.

As an alternative to proper scoring rules, Page (1988, p. 47) has suggested a "pivot mechanism" for eliciting probability predictions. This pivot mechanism bases its rewards on a comparison between one forecaster's prediction and other forecasters' predictions, though the method of comparison appears considerably different than the method of this application. Translated to the terminology of this application, the payment P to the forecaster is computed as:

$$P = \begin{cases} (1 - G(X_{ci}))A + B, & \text{if } X_a = 1 \text{ and } X_i \geq G(X_{ci}), \\ B, & \text{if } X_a = 1 \text{ and } X_i < G(X_{ci}), \\ C, & \text{if } X_a = 0 \text{ and } X_i \geq G(X_{ci}), \\ G(X_{ci})A + C, & \text{if } X_a = 0 \text{ and } X_i < G(X_{ci}). \end{cases}$$

Where A, B, C are constants, A>0, $X_a$ is the observation of whether the event occurred or not, $X_i$ is forecaster i's prediction of the probability of the event, and $G(X_{ci})$ is an aggregation of other forecasters' predictions of the same probability.

Kadane and Winkler (1988, pp. 360–361) also discuss the elicitation of probabilities using promissory notes. That is, we can create a promissory note which pays R (R>0) if an event occurs, and nothing otherwise. One can then open up a market for trade in such promissory notes. An auctioneer can then adjust prices up or down until desired sales equal desired purchases. The price, Q, which clears the market then implies a particular probability, Q/R, for the event in question.

As a matter of general knowledge, it is common practice in the financial world to trade stocks, bonds, futures, put and call options, and other financial instruments in well-organized financial stock markets. The price at which a financial instrument trades can be interpreted as an implicit "prediction" concerning its future value. Thus, the price at which a stock trades is implicitly a "prediction" of future corporate profits or dividends. This implicit prediction results from the interaction of stock buyers and stock sellers who each try to further their own interests in the course of trade. The incentives of traders in markets of this type are not the same as the incentives of the method of this patent application.

The design of forecasting incentives is also discussed in the following two publications by Kent Osband:

III. Osband, Kent Harold (1985). *Providing Incentives for Better Cost Forecasting*, Ph.D. Dissertation, University of California, Berkeley (Ann Arbor, Mich.: University Microfilms International); and IV. Osband, Kent (1989). "Optimal Forecasting Incentives," *Journal of Political Economy*, vol. 97, no. 5, pp. 1091–1112.

Osband (1989) claims to disclose a set of "optimal forecasting incentives." These incentives (listed on pages 1094–95) apply only when one forecaster is to be hired, whereas the method of this application requires the hiring of at least two forecasters In Appendix B on page 1111 Osband states, "The treatment of competition in the text assumes that the planner ultimately hires only one forecaster." And, "It remains an open question whether splitting investigations [i.e., hiring more forecasters] might be superior when measurements are correlated across forecasters." Osband (1989) does not address the question of what an incentive scheme might look like if it were optimal to hire more than one forecaster.

Osband's thesis (1985) does discuss the question of compensation schemes for two or more forecasters. The most pertinent part of Osband (1985) is Section 5.5, "Reducing Agency Costs Through Competition," pp. 112–117. In equations (5.26), (5.27), and (5.28), pp. 113–114, Osband discloses a compensation scheme for two or more forecasters. These equations are intended to indicate the optimal set of contracts for eliciting forecasts when the loss function takes the quadratic form, $L(X_a, G(X_c)) = c(G(X_c) - X_a)^2$, where c>0 (p. 89). Since the loss function can take many different forms in general, Osband's compensation scheme is limited to this special case.

To facilitate interpretation of Osband's scheme, the following translation of Osband's notation into my notation is offered:

| Osband | Lundgren |
| --- | --- |
| $Y = \hat{W} = g^j(\hat{W}^j; \hat{W}^{ij})$ | $G(X_c)$ |
| $W^j, \hat{W}^j$ | $X_i$ |
| $W^{ij}, \hat{W}^{ij}$ | $G(X_{ci})$ |
| $B_j hN(N-1)$ | z (newly defined) |
| $R^j(Y; W^{ij}) =$ | $z(G(X_c) - G(X_{ci}))^2$ |
| $b_j hN(N-1)(Y - W^{ij})^2$ | |
| $R^j_i(Y; W^{ij}) = (R^j/Y)$ | $(R^j/G(X_c)) = 2z(G(X_c) - G(X_{ci}))$ |
| $H^j(Y, x; W^{ij})$ | $P_i(X_i, X_{ci}, X_a)$ |
| principal/planner | forecast requisitioner |
| agent | forecaster |
| scoring rule | compensation function |

The compensation scheme in (5.27) is based on a "surplus function," $R^j(\bullet)$, (which has no direct relationship to a loss function) minus the partial derivative, $R^{j\prime}(\bullet)$, of this surplus function with respect to the forecaster's prediction (Compare p. 10 and p. 13, eq. 2.4.). At least superficially, this scheme has no direct relationship to the compensation scheme of the present application, which requires that one loss function be subtracted from another loss function, and does not require any computation of derivatives. However, since calculations per se are not patentable, a mere difference in manner of calculation is of no import for patent purposes, if it can be shown that the two calculations provide essentially the same numbers for practical application. Hence, it is necessary to explore whether the calculations are equivalent.

Under Osband's scheme, equation (5.27) reduces to:

$$\begin{aligned} P_i(X_i, X_{ci}, X_a) &= z(G(X_c) - G(X_{ci}))^2 - \\ &\quad z2(G(X_c) - G(X_{ci}))(G(X_c) - X_a) \\ &= z[-G(X_c)^2 + G(X_{ci})^2 + \\ &\quad 2X_a G(X_c) - 2X_a G(X_{ci})] \end{aligned}$$

Under the scheme of this application, and using Osband's assumed loss function, equation (6) of this application reduces to:

$$\begin{aligned} P_i(X_i, X_{ci}, X_a) &= F + kL(X_a, G(X_{ci})) - \\ &\quad kL(X_a, G(X_c)) \\ &= F + kc(G(X_{ci}) - X_a)^2 - \\ &\quad kc(G(X_c) - X_a)^2 \\ &= F + kc[G(X_{ci})^2 - \\ &\quad 2X_a G(X_{ci}) - G(X_c)^2 + 2X_a G(X_c)] \end{aligned}$$

It would appear that the two calculations can be made equivalent, if we assume F=0 and k=z/c. However, a mere identity of calculation is of no import for patent purposes, if it can be shown that the calculation is being applied in a different manner in its practical application.

A point of difference between the two compensation methods is that z is not an arbitrary constant in the Osband method. Rather, $z = b_j hN(N-1)$, where h is the precision of a "measurement" by the forecaster, $b_j$ is the cost of a measurement by forecaster j, and $N = \Sigma m_j$ is the total number of measurements desired by the forecast requisitioner (p. 113).

Hence, the Osband thesis teaches, or appears to teach, that the forecast requisitioner must perform the further step(s) of ascertaining the cost of a "measurement" by each forecaster, the precision of the measurements, and the total number of measurements desired. The Osband thesis does not disclose that these extra steps are unnecessary.

By contrast, the method of the present application makes no use of such data collection steps. When forecasters are risk neutral (as Osband assumes, p. 93), k is optimally set equal to one in the present method. The extra data collection steps appear to provide no extra benefit and do not seem essential. Consequently, the present method imposes fewer data collection burdens on the forecast requisitioner.

A second limitation of the method of the Osband thesis is that it assumes that the cost of a "measurement" of given precision is constant for a given forecaster, no matter how many "measurements" the forecaster takes (pp. 90, 98, 99, 113). Interpreted literally, the method seems to cover only those forecasts which allow of objective measurement and mechanical calculation. Allowing for some metaphorical license, the method might be interpreted as covering those forecasts which require subjective judgement, provided that additional units of forecast precision can be obtained at constant unit cost in terms of the expenditure of additional units of mental effort. This condition is extremely unlikely to hold in practice, since we would normally expect a nonconstant and variable relationship between the costs of time, money, and effort and the resulting precision of the forecast. By contrast, the present method imposes no requirements concerning the constant or nonconstant nature of the relationship between costs and forecast precision.

Thirdly, as noted previously, the method of the Osband thesis is limited to a particular loss function, whereas the present method is not limited to particular loss functions. Moreover, the surplus function of p. 113 is not derived by any direct mathematical operation upon the quadratic loss function of p. 89. Rather, the surplus function is derived via Theorem 5.2 (pp. 114, 99), which is only indirectly related to the quadratic loss function on p. 89. It would not be obvious to an economist of ordinary skill how (if at all) one could use the Osband technique to derive an appropriate surplus function to correspond with a different loss function.

Finally, some background information on Osband (1985) might be useful in interpreting this publication. Osband's thesis is primarily concerned with identifying, out of the class of all possible compensation methods, those methods which are "incentive compatible" for risk-neutral forecasters. "Incentive compatible" means that forecasters have an incentive to issue honest forecasts. That is, a forecaster has reason to believe that an honest forecast will yield higher expected rewards than a dishonest forecast. Only a small fraction of all possible and conceivable compensation systems for forecasters are incentive compatible.

The compensation systems identified by this application are also incentive compatible for risk-neutral forecasters. The present application identifies those compensation systems which also tend to yield unbiased predictions from risk-averse forecasters. Only a small fraction of the schemes which are incentive compatible for risk-neutral forecasters also have the quality of yielding (nearly) unbiased predictions from risk-averse forecasters. The present application identifies that class, which requires that forecasts from two or more forecasters be solicited and compared.

As Osband notes (pp. 44–50), any compensation method which is incentive compatible for risk-neutral forecasters can be altered to become incentive compatible for risk-averse forecasters. This requires knowing the forecaster's "utility function"—the actual extent to which the forecaster is risk averse. This is not easy to observe. By contrast, the compensation methods of this application do not require knowledge of the amount by which the forecaster is risk averse. Additionally, the two classes of incentive schemes are not identical and (very probably) do not overlap. Only in Chapter 5, Section 5 (pp. 112–117), does Osband discuss compensation systems involving two or more forecasters, as required by the method of this application.

In Chapter 5 (pp.87–123), Osband attempts to identify, out of the class of all compensation methods which are incentive compatible for risk neutral forecasters, that particular subclass of methods which elicit optimal levels of effort from risk-neutral forecasters. Osband makes no attempt in this chapter to identify any subclass of compensation methods that have any special properties with respect to risk-averse forecasters. Perhaps coincidentally, these two subclasses appear to have certain similarities, subject to the qualifications and limitations discussed earlier in this description of related art.

SUMMARY OF THE INVENTION

Statement of the Problem

Suppose that the goal of the principal (forecast requisitioner) is to obtain an accurate prediction concerning the future realization of a random variable X. Suppose further, that this goal is to be accomplished indirectly, rather than directly, by hiring a set of agents (forecasters) who will do the actual forecasting. The problem for the forecast requisitioner is to set forth a method of compensation to the forecasters such that the forecasters have incentive to provide tolerably good forecasts at a tolerably low cost. For purposes of this problem, we make no assumption that the forecast requisitioner has any detailed knowledge of how the forecasters perform their task.

When forecasters' predictions differ, there is a need to aggregate individual predictions to obtain a collective prediction suitable for further action. A typical method of aggregation might be to take an average or weighted average of forecasters' predictions, such as an arithmetic mean or a geometric mean. Let $X_c$ represent the vector of individual predictions, $X^1, X^2, \ldots, X^n$ of forecasters $1, 2, \ldots, n$. Suppose that we have a well-defined prediction aggregator function which yields specific collective predictions when given information concerning any one or more predictions from individual forecasters. Such a prediction aggregator function might be generalized as follows:

$$G(X_c) = G(X_1, X_2, X_3, \ldots, X_n) \tag{1}$$

Let $X_{ci}$ represent the vector of predictions of all forecasters except forecaster i. $G(X_{ci})$ is a "secondary collective prediction," which would presumably be issued in the absence of forecaster i's prediction. That is, the secondary collective prediction for forecaster i is based on the individual predictions of all forecasters except for forecaster i. There are n such secondary collective predictions, one for each of the n forecasters.

The reason for calculating the secondary collective predictions is to allow us to assess the contribution of each forecaster to the accuracy of the collective prediction. If the collective prediction is closer to the actual value of X than the secondary collective prediction, this means that the individual forecaster has improved the collective prediction. On the other hand, if the collective prediction is farther away from the actual value of X than the secondary collective prediction, this means that the individual forecaster has moved the collective prediction further away from the ultimate realization of the variable X. If the secondary collective prediction is identical to the collective prediction, then the forecaster has caused no change in the collective prediction.

Let $B(X_a, G(X_c))$ be the benefits which accrue when $G(X_c)$ is the collective prediction of X, while $X_a$ is an actual or estimated value of X which is later observed. The loss function, $L(X_a, G(X_c))$, tells us the lost benefits which occur when the predicted X differs from its actual value:

$$L(X_a, G(X_c)) = B(X_a, X_a) - B(X_a, G(X_c)) \quad (2)$$

The value $X_a$ is a "criterion value"—a variable value which is used to judge the accuracy or inaccuracy of forecasters' predictions.

A possible goal of the forecast requisitioner is to minimize the sum of a) the welfare loss from erroneous prediction, $L(X_a, G(X_c))$, plus b) the opportunity costs of forecaster effort, plus c) the costs of the risk premia needed to compensate risk-averse forecasters for their acceptance of risk. As an initial simplification, assume that the opportunity costs of forecaster effort are already sunk and that the requisitioner's goal is simply to elicit unbiased predictions, given the information sets already at forecasters' disposal.

To accomplish this task, the forecast requisitioner must choose a payment schedule (P) for each forecaster such that each forecaster is motivated to provide a prediction which minimizes the expected loss, $E(L)$. The payment schedule for each forecaster can be made a function of $X_a$ and each $X_i$: $P_i = P_i(X_a, X_1, X_2, X_3, \ldots, X_n) = P_i(X_a, X_i, X_{ci})$. Given the payment schedule, each forecaster will choose his prediction to maximize his own utility, given his own utility function which we may presume is not directly observed by others.

Let $f(X_a)$ be a probability density function which is based on the combined information sets of all forecasters. The optimal collective prediction ($G^*$) minimizes the expected loss:

$$E(L) = \int_{-\infty}^{\infty} f(X_a) L(X_a, G(X_c)) dX_a \quad (3)$$

Choosing $G^*$ to minimize $E(L)$ means that the following first-order condition must be satisfied:

$$\frac{d}{dG(X_c)} \int_{-\infty}^{\infty} f(X_a) L(X_a, G(X_c)) dX_a = 0 \quad (4)$$

Ideally, we want each forecaster to choose individual predictions such that the collective prediction tends to satisfy the above condition.

The VMP Method of Solution

The guiding economic intuition behind the invention is that paying forecasters according to their value marginal product (VMP) is likely to have good incentive effects in terms of both attracting the right number of forecasters and motivating the right level of effort. If we can accurately measure both the cost and the expected VMP of each forecaster, then we can hire forecasters until the cost of an additional forecaster equals his VMP. This would assure forecasting efficiency on the extensive margin (optimal number of forecasters). Additionally, if we can observe the VMP of each forecaster, we can compensate each forecaster in accordance therewith. This would assure forecasting efficiency on the intensive margin (optimal intensity of effort per forecaster). Despite the unobservability of mental effort, compensation according to forecaster VMP assures that each forecaster will continue to exert mental efforts until the marginal cost of an extra unit of mental effort equals its marginal benefit in terms of its expected increase in VMP.

Payment according to VMP requires some definition and measurement of VMP in the field of forecasting. We use here a proxy for VMP which we call "marginal contribution." The marginal contribution asks how the value of a collective forecast changes, as the prediction of a particular forecaster is either contributed or withheld. The marginal contribution of forecaster i ($FMC_i$) towards the accuracy of the collective forecast can be given by the equation:

$$\begin{aligned} FMC_i &= B(X_a, G(X_c)) - B(X_a, G(X_{ci})) \\ &= L(X_a, G(X_{ci})) - L(X_a, G(X_c)) \end{aligned} \quad (5)$$

The marginal contribution for a particular forecaster might well be positive, zero, or negative, depending on whether $X_i$ moves the collective forecast towards or away from $X_a$. Typically, the sum of the marginal contributions for all forecasters combined will be positive. Typically, also, the expected marginal contribution (before observation of $X_a$) of each forecaster would be positive, as well, if we assume that each forecaster has at least some information of value to contribute to the collective prediction.

Hence, a natural candidate for the pay schedule of each forecaster would look something as follows:

$$P_i(X_i, X_{ci}, X_a) = F + kL(X_a, G(X_{ci})) - kL(X_a, G(X_i, X_{ci})), \quad (6)$$

where $k > 0$.

The payment schedule in (6) is simply a constant multiple of the VMP formula in equation (5). It remains now to test whether this payment schedule accomplishes its intended purpose.

Testing the Solution

This incentive scheme can be tested on two types of situation. In the first situation, all forecasters have identical beliefs concerning the probability distribution of $X_a$. In the second situation, forecasters have different beliefs or information about the probability distribution of $X_a$. Two propositions can be stated:

Proposition 1: When all forecasters have identical beliefs and information sets concerning the probability distribution of $X_a$, the incentive scheme in (6), combined with an optimal prediction aggregator function, yields optimal individual and collective predictions, regardless of whether forecasters are risk neutral or risk averse, provided at least two forecasters issue predictions.

Proposition 2: When all forecasters are risk neutral, the incentive scheme in (6), combined with an optimal prediction aggregator function, yields optimal collective predictions, regardless of whether or not forecasters have identical beliefs or information sets about the probability distribution of $X_a$.

We first define an optimal prediction aggregator function. If we assume that forecasters issue forecasts simultaneously, then each forecaster i is constrained to base his own forecast $X_i$ on his own information set $I_i$, so that we may posit the existence of functions $X_i = X_i(I_i)$ and $X_{ci} = X_{ci}(I_{ci})$. An optimal prediction aggregator function is one which, given that the predictions of each forecaster are reported in accordance with the function $X_i(I_i)$, the function G chooses the optimal collective prediction $G^*$, given the combined information sets of all forecasters.

$$G = G(X_1(I_1), X_2(I_2), X_3(I_3), \ldots, X_n(I_n)) \quad (7)$$
$$= G^*(I_1, I_2, I_3, \ldots, I_n)$$

An optimal aggregator function is not necessarily unique. In addition, optimality of the aggregator function will sometimes require that each forecaster issue a vector of predictions, rather than a single prediction. It is not necessary to the practice of the invention that an optimal aggregator function be used. However, use of a nonoptimal aggregator function may degrade the quality of the collective forecasts.

We may assume that each forecaster, indexed by i, has a utility function in wealth (or income) of $U_i(W)$. For convenience of illustration, assume that the utility function takes the quadratic form, $U_i(W) = W + C_i W^2$. This assumption is not essential to the proofs of Propositions 1 and 2.

For Proposition 1, the forecaster must choose $X_i$ to maximize his expected utility under the payment scheme:

$$\int_{-\infty}^{\infty} U_i(W_i + P_i(X_i, X_{ci}, X_a)) f(X_a) dX_a \quad (8)$$

If the forecaster's utility function is quadratic, this problem becomes one of maximizing the integrals:

$$\int_{-\infty}^{\infty} [W_i + F + kL(X_a, G(X_{ci})) - \quad (9)$$
$$kL(X_a, G(X_i, X_{ci}))] f(X_a) dX_a +$$
$$\int_{-\infty}^{\infty} C_i [W_i + F + kL(X_a, G(X_{ci})) -$$
$$kL(X_a, G(X_i, X_{ci}))]^2 f(X_a) dX_a$$

Rearranging terms, the forecaster must maximize:

$$(W_i + F) + C_i(W_i + F)^2 + \quad (10)$$
$$k(1 + 2C_i(W_i + F)) \int_{-\infty}^{\infty} (L(X_a, G(X_{ci})) -$$
$$L(X_a, G(X_i, X_{ci})) f(X_a) dX_a +$$
$$k^2 C_i \int_{-\infty}^{\infty} (L(X_a, G(X_{ci})) - L(X_a, G(X_i, X_{ci}))^2 f(X_a) dX_a$$

Solving the above problem requires taking partial derivatives with respect to $X_i$ and setting them equal to zero:

$$-k(1 + 2C_i(W_i + F)) \int_{-\infty}^{\infty} (dL/dG)(dG/dX_i) f(X_a) dX_a - \quad (11)$$
$$2k^2 C_i \int_{-\infty}^{\infty} [L(X_a, G(X_{ci})) - L(X_a, G(X_i, X_{ci}))]*$$
$$(dL/dG)(dG/dX_i) f(X_a) dX_a = 0$$

For our analysis of the first situation, let $G^*$ be the optimal prediction from equation (4). All forecasters are agreed that $G^*$ is the optimal prediction. Assume further that all rival forecasters are motivated to suggest $G^*$ as their prediction, so that $G(X_{ci}) = G^*$. Hence, if $X_i = G^*$ properly solves the equation under these circumstances, then we know that the forecaster has been properly motivated. If we assume $G(G^*, G^*) = G^*$ and substitute these assumed values into (11), the second integral drops out, and the first-order condition reduces to:

$$-k(1 + 2C_i(W_i + F)) \int_{-\infty}^{\infty} (dL/dG)(dG/dX_i) f(X_a) dX_a = 0 \quad (12)$$

From equation (4) this integral equals zero when $X_i = G(X_{ci}) = G^*$. The second-order condition for utility maximization is also satisfied, provided forecasters are risk averse ($C_i < 0$) or risk neutral ($C_i = 0$). Hence, it is a Nash equilibrium for all forecasters to choose $X_i = G^*$, even if risk-averse. This proposition is true in general for risk-averse forecasters, and does not require the assumption of quadratic utility, since a truthful prediction receives a constant payoff of F while a non-truthful prediction receives a random payoff with expected value less than F. At least when forecasters are agreed concerning the probability distribution of $X_a$, risk aversion does not bias the forecaster's prediction and the actual extent of risk aversion is irrelevant to the optimal functioning of this forecasting method.

For the more realistic situation of Proposition 2, assume that different forecasters have different opinions about the probability distribution for the variable X. This leaves open the possibility that $X_i$ differs from $G(X_{ci})$, and that a forecaster may have advance awareness of this fact. Suppose that forecaster predictions differ because they have access to different (but possibly overlapping) information sets. Each forecaster i, after observing $I_i$, must choose $X_i$ to maximize his expected utility in the following double integral:

$$\int_{-\infty}^{\infty} \int_{-\infty}^{\infty} U_i(W_i + P_i(X_i, X_{ci}(I_{ci}), X_a)) f(X_a|I_i, I_{ci}) * g(I_{ci}|I_i) dX_a dI_{ci} \quad (13)$$

f( ) and g( ) are probability density functions conjectured by forecaster i and conditional on the information sets indicated. If $I_{ci}$ is a vector, there will be several integrations to correspond to each of the information variables of each rival forecaster. We may now ask the question of whether it is optimal for forecaster i to issue predictions according to the function $X_i(I_i)$ if he assumes that all other forecasters j are issuing their predictions according to the functions $X_j(I_j)$.

If the forecaster's utility function is quadratic, his problem becomes one of maximizing the integrals:

$$(W_i + F) + C_i(W_i + F)^2 + \quad (14)$$
$$k(1 + 2C_i(W_i + F)) * \int_{-\infty}^{\infty} \int_{-\infty}^{\infty} [L(X_a, G(X_{ci}(I_{ci}))) -$$
$$L(X_a, G(X_i, X_{ci}(I_{ci})))] * f(X_a|I_i, I_{ci}) g(I_{ci}|I_i) dX_a dI_{ci} +$$
$$k^2 C_i \int_{-\infty}^{\infty} \int_{-\infty}^{\infty} [L(X_a, G(X_{ci}(I_{ci}))) -$$
$$L(X_a, G(X_i, X_{ci}(I_{ci})))]^2 * f(X_a|I_i, I_{ci}) g(I_{ci}|I_i) dX_a dI_{ci}$$

Solving the above problem requires taking partial derivatives with respect to $X_i$ and setting them equal to zero:

$$-k(1 + 2C_i(W_i + F)) \int_{-\infty}^{\infty} \int_{-\infty}^{\infty} (dL/dG)(dG/dX_i) * \quad (15)$$
$$f(X_a|I_i, I_{ci}) g(I_{ci}|I_i) dX_a dI_{ci} +$$
$$2k^2 C_i \int_{-\infty}^{\infty} \int_{-\infty}^{\infty} [L(X_a, G(X_{ci})) -$$

-continued $$L(X_a, G(X_i, X_{ci}))|(dL/dG)(dG/dX_i)*$$

$$f(X_a|I_i, I_{ci})g(I_{ci}|I_i)dX_a dI_{ci} = 0$$

Suppose now that forecaster i chooses $X_i$ according to $X_i(I_i)$ so that $G(X_i, X_{ci}) = G^*$ as indicated in (7). We must now ascertain whether this choice of $X_i$ solves (15). From equation (4) the first double integral vanishes, but the second double integral is not necessarily zero in general. Hence, we are completely assured of unbiased prediction submissions from forecasters under this scheme only if $C_i = 0$, meaning that forecasters must be risk neutral.

If forecasters are risk averse, they will have a tendency to want to bias their predictions toward the expected or perceived value of $G(X_{ci})$ (which minimizes risk if $G(X_{ci})$ is known with certainty), rather than the requisitioner's preferred value of $X_i$ which would also maximize expected forecaster payment. However, this bias cannot occur unless the forecaster knows, or can reasonably infer, the probable direction and magnitude of the difference between $X_i(I_i)$ and $G(X_{ci})$. When forecasts are offered simultaneously, $G(X_{ci})$ does not become known until after $X_i$ has already been submitted, so that the optimal bias may be (near) zero, because the forecaster's ignorant best guess of $G(X_{ci})$ is that its expected value is near $X_i(I_i)$.

An Example

In many practical applications, it will often be a good approximation of reality to assume that random variables are normally distributed, that loss functions are quadratic, and that compensation from a particular forecasting task is small relative to forecaster income. In this example, assume that forecasters are risk neutral, that all random variables are normally distributed, and that the loss function takes the quadratic form:

$$L(X_a, G(X_c)) = h(X_a - G(X_c))^2, h > 0 \quad (16)$$

Since the loss function is quadratic, the optimal prediction is the expected value of $X_a$. We set $h=1$, since it makes no difference to the qualitative results.

Suppose further that X is the sum of two random variables, a humanly observable signal, S, and an unpredictable component, $E_a$. Each forecaster observes $I_i$, which is an observation of S that is clouded by a forecaster-specific error term $E_i$. Each error term is independent of all other error terms and also of $E_a$ and S. The variables are defined or distributed as follows:

$$X_a = S + E_a$$

$$I_i = S + E_i$$

$$S \sim N(0, \sigma_s^2)$$

$$E_a \sim N(0, \sigma_a^2)$$

$$E_i \sim N(0, 1/\tau_i) \quad (17)$$

Perhaps due to differences in opportunity, effort, or skill, the expected precision ($\tau_i$) of each forecaster's forecast may well be different. In this example we assume a) that the requisitioner has no advance knowledge of the proper weights to be attributed to each forecast, and b) does not know how the various $I_i$'s should be aggregated to determine the optimal prediction, given the $I_i$'s. We assume, however, that the forecasters themselves have the necessary sophistication to perform both tasks, provided they are properly motivated. Suppose, therefore, that each forecaster submits a prediction, $X_i$, and an expected precision, $T_i$, and that the forecast requisitioner aggregates predictions in the following simple-minded way:

$$G(X_c) = \sum_{i=1}^{N} T_i X_i / T_c, \quad (18)$$

$$\text{where } T_c = \sum_{i=1}^{N} T_i.$$

The requisitioner simply takes a weighted average of each prediction $X_i$, based on the submitted weights, $T_i$, of each forecaster. Assuming the forecasters would be properly motivated to submit $T_i = \tau_i$ as the weight for each forecast, statistical theory tells us that the optimal $G(X_c)$ is computed as follows:

$$G^* = \sum_{i=1}^{N} \tau_i \beta I_i / \tau_c, \quad (19)$$

$$\text{where } \tau_c = \sum_{i=1}^{N} \tau_i \text{ and } \beta = \sigma_s^2/(\sigma_s^2 + 1/\tau_c).$$

Given the aggregator function in (18), it is sufficient for unbiasedness that $T_i = \tau_i$ and $X_i = \beta I_i$ for all forecasters. Note that the optimal $X_i$ depends on $\tau_c$. Since $T_c$ is not known in advance by each forecaster (though each forecaster may have a fair idea of the likely range), each forecaster would prefer to make his forecast conditional on $T_c$. Hence, let each forecaster submit both the conditional prediction function $X_i(T)$ and the unconditional weight $T_i$.

Suppose now that the forecast requisitioner provides the following definitions:

$$T_{ci} = \sum_{j \neq i} T_j$$

$$G(X_{ci}) = \sum_{j \neq i} T_j X_j / T_{ci} \quad (20)$$

and sets up the following pay schedule:

$$P_i(T_i, X_i(T), T_{ci}, X_{ci}(T), X_a) = (X_a - G(X_{ci}))^2 - (X_a - G(X_c))^2 \quad (21)$$

The pay schedule is equivalent to assuming F=0 and k=1 in equation (6) after plugging in the loss function of equation (16). It is possible to demonstrate the following proposition:

Proposition 3

Under the conditions of (16) and (17), the definitions of (18) and (20), and the pay schedule of (21), it is a Nash equilibrium for a group of risk-neutral forecasters to submit the weights and prediction functions that would lead to an optimal collective prediction.

DEFINITIONS

Nontrivial Function

A nontrivial function is a function, F( . . . ), which, given an ex ante probability distribution for all its arguments and prior to observing the actual values of the arguments of the function, there does not exist a value Z such that F( . . . )=Z with probability one.

It is assumed throughout this application and the claims that all aggregator functions, loss functions, and monotonic transformation functions are nontrivial.

Aggregator Function

An aggregator function, $G(X_1, X_2, X_3, \ldots X_n)$, is any function of the n predictions, $X_1, X_2, X_3, \ldots X_n$. The aggregator function might or might not include additional variables as arguments (e.g., the values of precision weights submitted by forecasters). An example of an aggregator function is $$g(X_1, X_2, X_3, \ldots X_n) = w_1 X_1 + w_2 X_2 + w_3 X_3 + \ldots + w_n X_n, \quad (22)$$

where $w_1 + w_2 + w_3 + \ldots + w_n = 1$.

Secondary Aggregator Function

A secondary aggregator function, $G_i(X_1, X_2, \ldots X_n)$, relative to the aggregator function, $G(X_1, X_2, \ldots X_n)$, is simply the function G applied to the n-1 predictions, $X_1, X_2, X_3, \ldots X_n$, but not including $X_i$ as an argument, provided that the function G is still defined after such deletion of one of its arguments. The secondary aggregator function $g_1$ relative to the aggregator function g in (D1) is $$g_1(X_1, X_2, \ldots X_n) = (w_2 X_2 + w_3 X_3 + \ldots + w_n X_n)/(1 - w_1). \quad (23)$$

Responsive Aggregator Function

A responsive aggregator function is an aggregator function, $G(X_1, X_2, \ldots X_n)$, such that, for each of its prediction arguments, $X_i$ (i=1, 2, \ldots, or n), a significant change in $X_i$ will cause at least some change in $G(X_1, X_2, \ldots X_n)$ for nearly all reasonable values of $X_1, X_2, X_3, \ldots X_n$.

It is assumed throughout this application and the claims that all collective predictions and secondary collective predictions are based on responsive aggregator functions.

Monotonic Transformation Function

A monotonic transformation of a value, Z, is a transformation according to a function, $M(Z)$, such that if $Z_1 > Z_2$ then $M(Z_1) \geq M(Z_2)$. Examples of monotonic transformations are the identity transformation, $M(Z)=Z$, and a linear transformation, $M(Z)=a+bZ$, where a is a constant and b is a positive constant.

Loss Function

A loss function, $L(X_a, X_c)$, is any function for a criterion value, $X_a$, and a predicted value, $X_c$, such that $L(x,x)=0$ for all x and $L(x,y) \geq 0$ for all x and all y.

Criterion Value

A criterion value is a variable value which is used to judge the accuracy or inaccuracy of forecasters' predictions. The criterion value can be an actual value of the variable being predicted, or some proxy value, such as a criterion estimate. If the actual value of the variable being predicted is observed within a reasonable period of time, it is natural to use the actual variable value as the criterion value. Otherwise, it is necessary to use a proxy. A proxy can be constructed from future estimates or predictions of the variable in question, or in some other manner, such as a composite of future observations and future predictions or estimates.

Precision Weight

A value submitted by a forecaster to the forecast requisitioner to be used as a weight on the forecaster's prediction when computing an aggregation of forecasters' predictions.

Aggregate Precision Weight

An aggregation of the precision weights submitted by one or more forecasters.

Prediction Function

A set of predictions or a prediction formula submitted by a forecaster, such that the actual prediction submitted for aggregation purposes is conditional on an aggregate prediction weight as one of its arguments.

Definite Prediction

The particular prediction which is selected by the prediction function, given the selection of a particular value for the aggregate precision weight.

Criterion Prediction

A criterion prediction is a definite prediction which is computed in a special way from a prediction function. Generally, a criterion prediction is based on the value which a prediction function would take on if the aggregate of prediction weights summed to infinity.

Criterion Estimate

A criterion estimate is a criterion value which is computed in a special way from the predictions of other forecaster(s). Generally, a criterion estimate is based on an aggregation of the criterion predictions of one or more forecasters.

Compensation

Compensation refers to the provision of money or its equivalents, financial or real assets, and/or goods or services capable of provision within the natural, physical, or real world. Fines, penalties, and punishments are a form of negative compensation.

Statutory Process

Process means process, art, or method. A statutory process is defined as any use of a statutory process, machine, manufacture, composition of matter, or material, including use as a form of compensation for services rendered. (See definition of "process" in 35 U.S.C. § 100(b).)

Statutory Compensation

Statutory compensation refers to the provision of any one or more of the following as a form of compensation: a statutory process, a machine, a manufacture, a composition of matter, or a material.

Nash Equilibrium

A particular set of strategies (e.g., predictions, prediction weights) for a group of forecasters is a Nash equilibrium, if there is no incentive for any one forecaster within the group to deviate from his strategy. A forecaster will have no incentive to deviate from his Nash equilibrium strategy if there exists no other strategy which the forecaster could pursue which makes the forecaster strictly better off (e.g., gives the forecaster higher expected pay or reduces his risk).

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
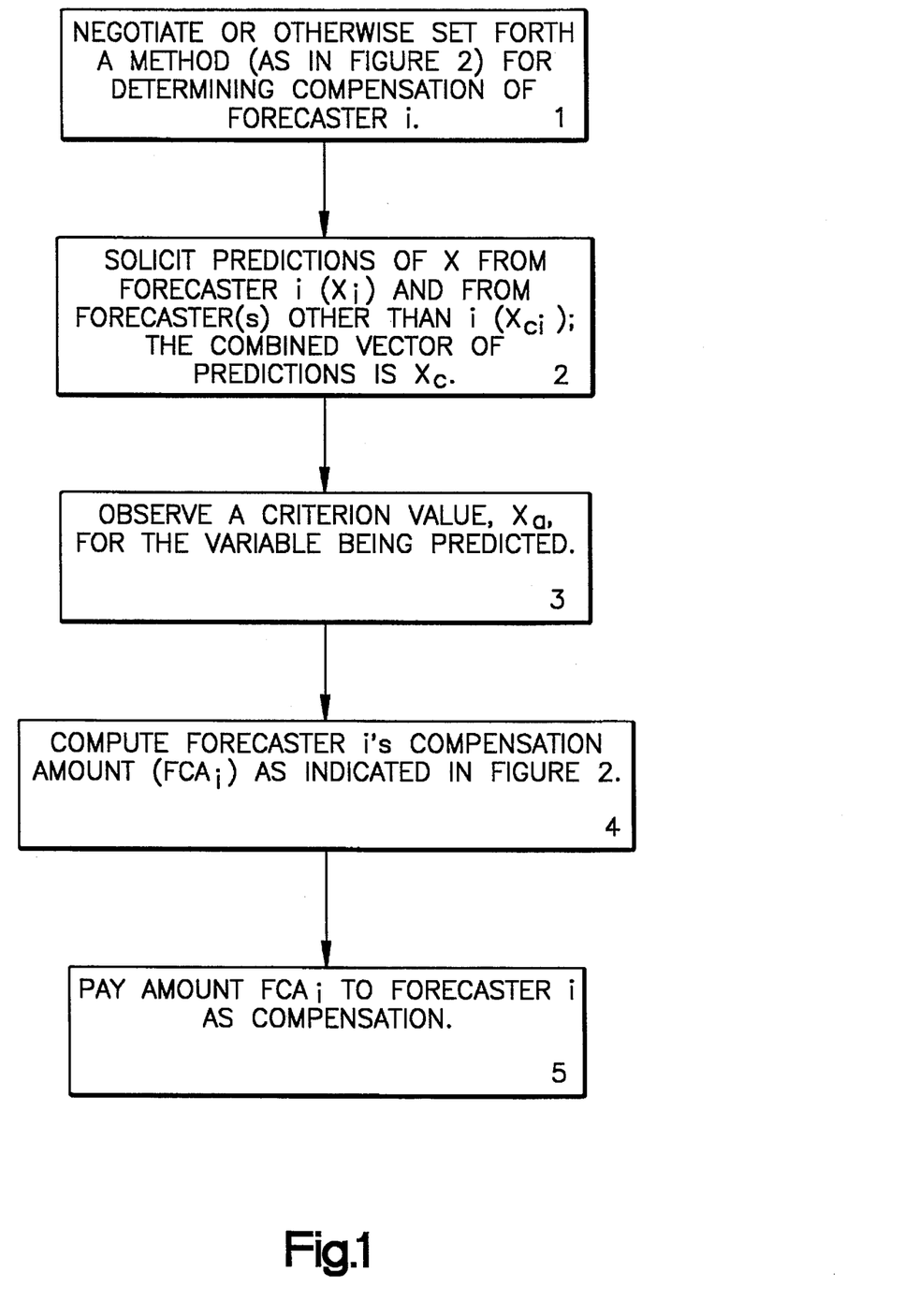
FIG. 1 is a flowchart illustrating the method of the present invention, showing the steps necessary for a scheme of motivating forecasters through pecuniary incentives.
Figure 2:
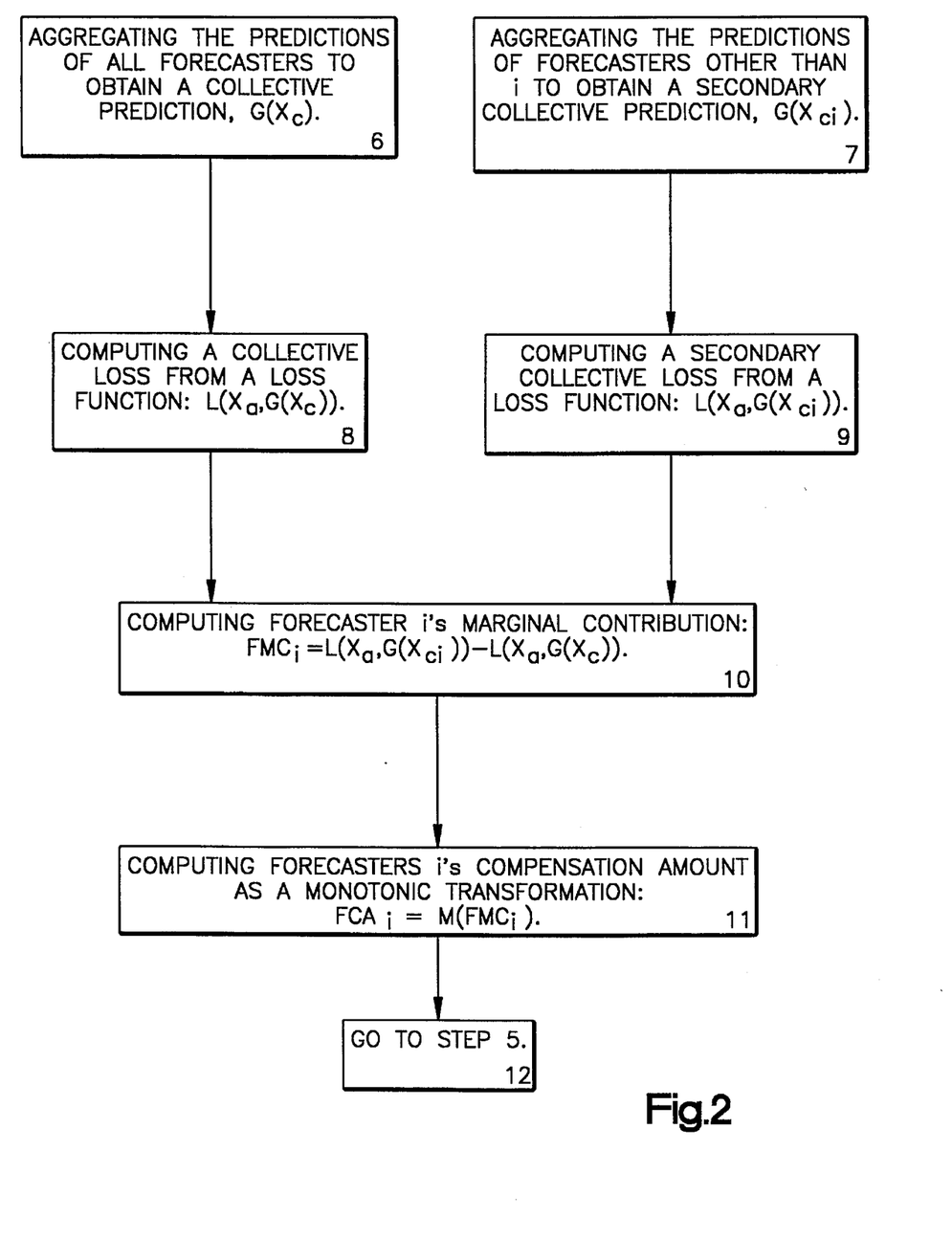
FIG. 2 is an intermediate flowchart corresponding to Box 4 of FIG. 1 and showing the computational aspect of the invention in determining the amount of a forecaster's compensation.

FIGS. 1 and 2 show the logical steps involved in properly motivating a forecaster to provide accurate predictions of an unknown variable value. The flow charts describe a method by which a single forecaster in a single forecasting group is motivated to supply accurate predictions. The present invention works best as a system or combination in which two or more forecasters are each motivated by this method.

In a preferred embodiment of the invention illustrated in FIG. 1 of the drawings, Step 1 is the reasonable step of informing the forecaster of the method or criteria by which he is to be compensated. The amounts to be paid the forecaster under each contingency might be set forth, on a take it or leave it basis, by the party (public or private) responsible for determining forecaster compensation. Alternatively, the amounts might be negotiated with individual forecaster(s) or set out to bid among several forecasters. Typically, a potential forecaster will wish to negotiate the amounts or level of compensation, rather than the general nature of the contingency basis by which he is given incentive to provide accurate forecasts. Arguably, Step 1 is somewhat dispensable, since one might rely on informal expectation rather than formal agreement concerning future compensation, though this would not be good practice.

Step 2 solicits a prediction ($X_i$) of the unknown variable value X from forecaster i. Step 2 also solicits a set of similar predictions of the unknown variable value X from at least one other forecaster. The vector of predictions of the other forecaster(s) is referred to as $X_{ci}$. The combined vector of predictions ($X_i$, $X_{ci}$) is referred to as $X_c$.

Step 3 observes a criterion value ($X_a$) for the unknown variable value being predicted. The criterion value may be an actual value of the variable being predicted, or some proxy value, such as a criterion estimate. The criterion value is used to judge the accuracy of forecasters' predictions.

Step 4 in FIG. 1 indicates that the subroutine in FIG. 2 is to be performed. The details of Step 4 of the present invention are discussed below in connection with FIG. 2.

Step 5 is the final step in the process, without which the forecaster would fail to be properly motivated. The forecaster must be paid. At the very least, the forecaster must have a reasonable basis for supposing that such compensation will be forthcoming.

Steps 1–5 are steps in a process of motivating forecasters which may be performed simultaneously more than once with respect to the same forecaster. For example, the same forecaster might be asked to make predictions concerning several different variables. As another example, the same forecast from a forecaster might be compensated in several different ways.

The method of paying forecasters has important and significant effects on the nature and quality of the forecasts which are initially reported. Bad methods of computing compensation would yield forecast reports with undesired properties. The step of collecting forecast data (Step 2) and the steps of computing and paying forecaster compensation (Steps 4 and 5) are therefore not unrelated and independent steps. Rather, the steps are interrelated.

Despite the unusual chronological order, it is actually Steps 4 and 5 (computing and paying compensation), operating in conjunction with Step 1 (setting forth compensation method), which causes, by means of a psychological process involving expectations, the predictions solicited in Step 2 to be reported in the precise manner that they are. Another way of saying this is that there important feedback effects from subsequent steps of the process onto previous steps of the process. That is, a change in the computation method in Step 4 can cause a change in the prediction values issued in Step 2. Despite the chronological ordering, Step 4 is not causally prior to Step 2, nor is Step 2 causally prior to Step 4. Step 4 refines or limits this process of soliciting forecasts, since a different method of computing payment can cause elicitation of different prediction values and yield a different set of collective forecasts.

Referring now to FIG. 2 of the drawings, we see the computational subroutine indicated by Box 4 in FIG. 1. The arrows in FIG. 2 indicate the general order in which steps should be performed. Steps 6 and 7 need be performed in no particular order, and can be performed prior to Step 3. Steps 8 and 9 need be performed in no particular order. Steps 6 through 11 are computational steps. The final computation in step 11 is inputted as data for Step 5 in FIG. 1.

Of necessity, the steps in the claims are listed in a particular order, though it should be noted that a different order of certain steps in the claims would yield logically equivalent results which are equivalently claimed and are not disclaimed.

Step 6 aggregates the predictions in Step 2 to obtain a collective prediction, $G(X_c)$. This aggregation is performed using an aggregator function.

Step 7 aggregates the predictions of the forecaster(s) other than forecaster i to obtain a secondary collective prediction, $G(X_{ci})$. This aggregation is performed using an aggregator function, which need not be the same aggregator function as in Step 6, though it may be. Frequently, it will be desirable that this second aggregator function be a secondary aggregator function of the aggregator function in Step 6.

Step 8 computes a value called the "collective loss." The collective loss is computed from a loss function, $L(X_a, G(X_c))$.

Step 9 computes a value called the "secondary collective loss." The secondary collective loss is computed using the same loss function as in Step 9, except the secondary collective loss is dependent upon $X_a$ and $G(X_{ci})$.

Step 10 computes forecaster i's marginal contribution, referred to here as $FMC_i$. This is computed using the formula, $FMC_i = L(X_a, G(X_{ci})) - L(X_a, G(X_c))$.

Step 11 computes forecaster i's compensation amount, referred to here as $FCA_i$. This is computed as a monotonic transformation of $FMC_i$ using the formula: $FCA_i = M(FMC_i)$. Normally, this monotonic transformation will be the identity transformation, $M(Z) = Z$, or a linear transformation, $M(Z) = a + bZ$, $b > 0$.

After Step 11 in FIG. 2 is completed, the subroutine exits via Step 12 to Step 5 of FIG. 1 in order to pay compensation amount $FCA_i$ to forecaster i.

In principle, the invention may be used to obtain predictions about any variable (either continuous or discrete) whose value is currently unknown. For example, one might obtain estimates concerning the probability that it will rain tomorrow (discrete event) or estimates concerning the temperature tomorrow (continuous variable). In what follows, three serious economic applications of potential interest are examined in detail: predictions about commodity markets, analysis of environmental activities, and evaluations of corporate profits.

Application 1: Commodity Markets

There are a variety of reasons why one might want accurate predictions concerning future prices and/or quantities of commodities (such as grain). From the point of view of farmers, farmers would like to know before they plant what price they can expect to receive for their harvested crop. If there is to be insurance for farmers, the insurers (whether public or private) must know probable prices and crop yields in various states and districts. After the crop is harvested, there is the question of whether the crops should be sold to the public immediately or placed in storage for sale later.

For this example we shall consider only the problem of predicting prices so farmers can plan how much to plant. The higher the expected harvest price, the more crop that farmers will want to plant. Hence, the supply curve prior to planting is upward sloping. However, once the crop is planted, the harvest supply is fixed (subject only to weather, etc.). The price of the harvest crop is determined only by the demand for it, even if this is a different price than what was expected when the crop was planted. The actual price may be higher or lower than what was expected.

An important aspect of this problem is that farmers must choose the quantity they will supply prior to knowing the actual price at which they can sell. Suppose that farmers base their supply decisions on the price predictions of a forecasting group using methods described herein, so that the price which farmers expect equals the predicted price of the forecasting group. If the actual price which ultimately develops equals the predicted price, then the forecasting group has made the optimal prediction and there is no deadweight loss to society. Let this optimal price and quantity be designated $P_o$ and $Q_o$.

Suppose that the forecasting group underpredicts this optimal price. The predicted price ($P_p$) is therefore less than the optimal price: $P_p<P_o$. The quantity supplied in response ($Q_r$) to this low predicted price is therefore smaller than the optimal quantity: $Q_r<Q_o$. The intersection of this smaller quantity supplied with the demand curve means that the actual price ($P_a$) must be higher than the optimal price: $P_a>P_o>P_p$. In the opposite situation where prices are overpredicted, it can be shown that $P_a<P_o<P_p$ and $Q_r>Q_o$. In this example it is logical to use the actual price as the criterion value for the predicted price.

Neither the optimal price and quantity nor the deadweight loss from erroneous predictions are directly observable empirically. However, estimates of the slope or elasticity of the supply and demand curves can be obtained using well-known econometric techniques of statistical analysis. Given knowledge of the actual and predicted prices and estimates of the slope or elasticity of the supply and demand curves, well-known economic theory allows us to estimate the deadweight loss. It is logical to use the resulting estimates of deadweight loss as the loss function for computing the marginal product of each forecaster.

Application 2: Environmental Externalities

Environmental externalities, such as air pollution or water pollution, come from many different sources, come in many different forms, and can have a variety of effects. The effects of different types of emission can range from the highly toxic to the relatively harmless. These effects can comprise damage to human life or health, damage to animal or plant life, damage to ecosystems, damage to the ozone layer, inconvenient sights or smells, and other effects. Both the production activities and the consumption activities of individuals, businesses, and governments can be potential sources of pollution.

The typical economic method recommended for reducing pollution is to impose a tax or fee on the source of pollution, with the tax or fee being proportioned to the estimated damage caused by the pollution. A pollution tax encourages businesses and consumers to reduce pollution levels and pollution harms, first by encouraging a switch to less harmful products and processes, and second by encouraging invention and innovation to find products and techniques which cause less pollution harm. For any given level of pollution reduction, a pollution tax enables the economy to achieve that reduction in the cheapest manner, possible.

The virtues of a pollution tax have been expounded elsewhere and will not be further detailed here. A few obstacles to implementing a pollution tax may be considered. First, the pollution from each individual source must be metered to assess the appropriate tax on each polluter. If metering is impractical (e.g., for automobile pollution), then some proxy for the pollution must be identified and taxed (e.g., engine types, mileage, gasoline usage, etc.). Second, the pollution tax laws must be enforced and pollution tax cheating must be deterred. Third, an estimate of the damages caused by each type of pollutant must be made, so as to be able to determine the appropriate tax rate for each pollutant.

The present invention can contribute to solving the second and third problems above by helping to obtain unbiased information concerning quantities of pollution and the damages caused as a result. Although quantities of legal (i.e., reported and taxed) pollution are presumably easy to compute, the quantity of illegal or unreported pollution must be estimated. Such estimates are useful to evaluate the performance of law enforcement efforts. Estimates of the marginal damage caused by each pollutant are necessary to determine the optimal tax rate for each pollutant. It is preferable that these estimates be obtained with as little bias as possible, with a minimum of political interference and partisan or special pleading.

The method of the present application can be used to motivate unbiased forecasts or estimates of environmental damage. The request for forecasts of damage should be specific as to a) particular type of pollutant, b) particular time period of emission, and c) particular geographical region of emission source. However, the estimate of environmental impacts should include damages which occur not only within the indicated time and space, but outside it as well. Thus, an assessment of air pollution emitted in Illinois should include a calculation of damages caused to Indiana. An assessment of fluorocarbon emissions in the year 1994 should include an estimate of resulting damages to the ozone layer in the years 1995–2010 and beyond. All possible impacts of an environmental emission should be assessed, regardless of their time or place, or level of certainty. Uncertain effects should be judged according to their level of possible severity and weighted by their estimated probability of occurrence.

To assure that estimates of environmental impacts will be motivated by objective considerations, rather than by politics, the environmental forecasters chosen for use by the method of this application should be chosen according to such nonpolitical criteria as education, intelligence, good moral character, and other indicators of probable competence in forecasting. Additionally, as forecasters build up a record of forecasts, their ability to predict well or badly can also be inferred, and their retention or removal from a pool of forecasters can be determined on such basis. Since there are many types of pollutant whose damages must be estimated, it is good that the particular forecasters who are to assess the probable damages from a particular pollutant should be randomly selected from a large, previously determined pool of professional forecasters. The political viewpoint of a forecaster is irrelevant, unless it is clearly evident that the viewpoint would result in bad faith forecasts.

The estimation of environmental damages is divisible into two analytically distinct parts. First, there are the objectively quantifiable physical effects: man-years of human life lost, damages to human health, damages to plant or animal life, sights or smells emitted, etc. Second, there is the monetary value of such physical damages. Although money values are certainly objective once they are determined, the translation of physical damages into money values has a certain subjective element. Normally, one would suppose that the monetary values to be attached to various types of damage would be politically or judicially determined, whereas the actual extent of physical damages may be determined by nonpolitical experts. Once the subjective component has been determined, the translation of objective physical damages into objective money values becomes an exercise in simple mathematics. For example, if it is professionally forecast that one million tons of a particular chemical emission causes Y man-years in life lost, and if it is politically determined that a man-year of life should be accounted as having a value of $Z, then the estimated damage from lives lost is $YZ.

Finally, even after deciding on the nature of an objective value which forecasters should try to estimate, there is one additional difference between the environmental application considered here and the commodity price application considered previously. This difference lies in the inability ever to know precisely the ultimate value of the quantity one is predicting. If one tries to predict commodity prices one year in the future, one learns in one year precisely what those prices turn out to be. However, with respect to environmental damages, one typically never obtains precise information no matter how much time passes by.

There are two ways by which the environmental predictions of particular forecasters might be judged. The first way is to use a criterion estimate which is determined contemporaneously based on the predictions of forecasters who have issued their predictions simultaneously. The second way is to use a criterion estimate which is determined in the future based on predictions issued in the future by forecasters predicting the same or similar variable. These two methods will be discussed in turn.

Contemporaneous Criterion Estimates

Suppose n forecasters are assigned to provide a forecast with respect to a variable whose precise value will never be observed. An observed value of the variable can therefore never be used to judge the accuracy of forecasters' predictions. In this circumstance, it might be supposed that the predictions of one set of forecasters might be used to judge the accuracy of the predictions of another set of forecasters.

Suppose that the n forecasters are divided into two, nonoverlapping groups, group A and group B. The criterion estimate technique set forth below will not work so well if any attempt is made to bring about overlapping membership in groups A and B. On the other hand, there is no problem in failing to exhaust use of all solicited and available forecasters between groups A and B. However, unless there is some good reason for omitting use of particular forecasts, it is generally preferable to make use of all the solicited and available forecasts.

The predictions in group A can be used to determine the compensation of forecasters in group B. Similarly, the predictions in group B can be used to determine the compensation of forecasters in group A. It might be logical to suppose that the criterion value for forecasters in group A should simply be the collective prediction of the forecasters in group B (and vice versa). However, this approach will not, in general, provide appropriate incentives for the two groups of forecasters to provide appropriate forecasts.

For example, suppose $\alpha$ is the unconditional mean of the random variable X, whereas the value of any particular realization of X is $\alpha+S$, where S is normally distributed with mean zero. If the loss function is quadratic, it is desirable that the criterion value, $X_a$, fulfill the following condition: $E(X_a|S)=\alpha+S$. However, the expectation of the collective prediction for group B, $G_B$, is $E(G_B|S)=\alpha+\beta_B S$, where $\beta_B=\sigma_s^2/(\sigma_s^2+1/\tau_B)$ and $\tau_B=\Sigma\tau_j$, $j\epsilon B$. Generally speaking, $\beta_B<1$. Hence, forecasters will not be motivated to provide an unbiased forecast of $X=\alpha+S$.

Suppose instead that the forecast requisitioner uses a criterion estimate as the criterion value. Let $X_{Be}$ be the criterion estimate which is based on predictions from group B. Ideally, we want $E(X_{Be}|S)=\alpha+S$. This can be accomplished if we were to aggregate the predictions that would be issued if forecasters assumed $\tau_B=\infty$. If $\tau_B=\infty$, then $\beta_B=\sigma_s^2/(\sigma_s^2+1/\infty)=1$. Hence, $E(X_{Be}|S)=\alpha+\beta_B S=\alpha+S=X$. This technique for determining the criterion estimate can therefore be used to motivate unbiased predictions of X.

To use this technique, let each forecaster submit a set of precision weights, $T_j$, and a prediction function, $X_j(T)$, where T is a value which the forecast requisitioner will later plug into a formula. If the forecast requisitioner wishes to compute a criterion estimate, T is set equal to infinity. If the forecast requisitioner wishes to compute a collective prediction or secondary collective prediction, T is set equal to the sum of issued $T_j$'s for the particular group of forecasters from which the collective prediction or secondary collective prediction is sought.

For example, if the method of aggregating predictions being used by the forecast requisitioner is that of taking arithmetic means, then the criterion estimates for groups A and B would be as follows:

$X_{Ae}=\Sigma X_j(T=\infty)T_j/T_A$, $j\epsilon A$, where $T_A=\Sigma T_j$, $j\epsilon A$, and $X_{Be}=\Sigma X_j(T=\infty)T_j/T_B$, $j\epsilon B$, where $T_B=\Sigma T_j$, $j\epsilon B$. (24)

The collective predictions for groups A and B and for all n forecasters combined (group C) would be as follows:

$G(X_A)=\Sigma X_j(T=T_A)T_j/T_A$, $j\epsilon A$, $G(X_B)=\Sigma X_j(T=T_B)T_j/T_B$, $j\epsilon B$, and $G(X_C)=\Sigma X_j(T=T_c)T_j/T_c$, all $j$, where $T_c=\Sigma T_j$, all $j$. (25)

For purposes of using the collective forecast (as opposed to calculating the compensation of forecasters), it is best to make use of $G(X_c)$ as the "official" collective forecast, since it is this forecast which incorporates the information of all the forecasters.

The secondary collective predictions for groups A and B would be as follows:

If $i \in A$, then $G(X_{Ai}) = \Sigma X_j(T=T_{Ai})T_j/T_{Ai}$, $j \in A$, $j \neq i$, where $T_{Ai} = \Sigma T_j$, $j \in A$, $j \neq i$, and If $i \in B$, then $G(X_{Bi}) = \Sigma X_j(T=T_{Bi})T_j/T_{B1}$, $j \in B$, $j \neq i$, where $T_{Bi} = \Sigma T_j$, $j \in B$, $j \neq i$. (26)

The pay schedule for any forecaster i in group A can be computed as follows:

$$P_i(T_i, X_i(T), T_{Ai}, X_{Ai}(T), X_{Be}) = F + kL(X_{Be}, G(X_{Ai})) - kL(X_{Be}, G(X_A)),$$
where $k > 0$. (27)

Similarly, the pay schedule for any forecaster i in group B can be computed as follows:

$$P_i(T_i, X_i(T), T_{Bi}, X_{Bi}(T), X_{Ae}) = F + kL(X_{Ae}, G(X_{Bi})) - kL(X_{Ae}, G(X_B)),$$
where $k > 0$. (28)

When forecasters are risk averse, this technique of using criterion estimates to determine forecaster compensation can be applied several different times using several different groupings of forecasters. An average of the compensation computed under each calculation can then be used to calculate the actual compensation to the particular forecaster. For example, if there are ten forecasters, the nine forecasters other than i can be grouped in as many as 510 ($2^9 - 2$) different ways. Computing an average of compensation reduces the variance of compensation, and would therefore be beneficial in reducing the risk premia which forecasters would demand in order to enter the forecasting task.

An additional variation on this method would group all forecasters other than i into group B to compute the criterion estimate and place forecaster i into group A as the only member of group A. When this is done, $G(X_{ci})$ is either undefined or arbitrary and $G(X_c)$ is simply $G(X_i)$. (In this instance, we would normally presume $G(X)=X$, for all X.) Hence, the pay schedule in equation (27) requires some modification. Under this variation, the pay schedule for forecaster i can be computed as follows:

$$P_i(T_i, X_i(T), X_{Be}) = F - kL(X_{Be}, G(X_i)), \text{ where } k > 0.$$ (29)

Alternatively under this variation, the forecast requisitioner can announce a prespecified value for $X_{Ai}$ (call it $X_p$ for preliminary prediction) and compute the pay schedule as in (27). The pay schedule for forecaster i would then be computed as follows:

$$P_i(T_i, X_i(T), X_p, X_{Be}) = F + kL(X_{Be}, G(X_p)) - kL(X_{Be}, G(X_i)), \text{ where } k > 0) \quad (30)$$

Any linear combination of (29) and (30) is possible as well. This would yield the following type of pay schedule for forecaster i:

$$P_i(T_i, X_i(T), X_p, X_{Be}) = F + k_1 L(X_{Be}, G(X_p)) - k_2 L(X_{Be}, G(X_i)), \text{ where } k_2 > 0. \quad (31)$$

Future Criterion Estimates

With respect to estimates of environmental damages, it may be expected or hoped that as more time passes by more accurate information and scientific investigation of cause-and effect relations will become available. Hence, although one never obtains precise knowledge of the causal relationships, it may be expected that knowledge improves in accuracy. Future knowledge may thus be used to assess the accuracy of present predictions. One may therefore use future forecasts to help motivate accurate contemporaneous predictions by forecasters.

Suppose that forecasters are divided into two nonoverlapping groups. Group C (contemporaneous forecasters) give forecasts of a particular variable value at point C in time. Group F (future forecasters) give forecasts of precisely the same variable at point F in time, where F is later than C. Group C is compensated based on the criterion estimate of group F. Group F observes the collective prediction and other relevant information provided by group C.

For this technique, if the method of aggregating predictions being used by the forecast requisitioner is that of taking arithmetic means, then the criterion estimates for groups C and F would be as follows:

$$X_{Ce} = \Sigma X_j(T=\infty)T_j/T_C, j \in C, \text{ where } T_C = \Sigma T_j, j \in C, \text{ and}$$

$$X_{Fe} = \Sigma X_j(T=\infty)T_j/T_F, j \in F, \text{ where } T_F = \Sigma T_j, j \in F. \quad (32)$$

The collective predictions for groups C and F would be as follows:

$$G(X_C) = \Sigma X_j(T=T_C)T_j/T_C, j \in C, \text{ and}$$

$$G(X_F) = \Sigma X_j(T=T_F)T_j/T_F, j \in F. \quad (33)$$

The secondary collective predictions for forecaster i in group C would be as follows:

$$G(X_{Ci}) = \Sigma X_j(T=T_{Ci})T_j/T_{ci}, j \in C, j \neq i, \text{ where } T_{Ci} = \Sigma T_j, j \in C, j \neq i. \quad (34)$$

The pay schedule for any forecaster i in group C can be computed as follows:

$$P_i(T_i, X_i(T), T_{Ci}, X_{Ci}(T), X_{Fe}) = F + kL(X_{Fe}, G(X_{Ci})) - kL(X_{Fe}, G(X_i, X_{Ci})),$$
where $k > 0$. (35)

The pay schedules for forecasters in group F can be left to the discretion of the forecast requisitioner. The pay schedules of future forecasters may utilize methods outlined in this application or may be otherwise determined.

A possible disadvantage of this future criterion estimate technique is that it may not always work properly. It can be shown in a simple model that if the precision of additional future information ($\tau_F$) does not exceed the precision of contemporaneous information ($\tau_C$), then expected forecaster pay of any forecaster in C will not be maximized if forecasters predict truthfully. In other words, if $X_{Fe}$ is influenced too much by future forecasters' observations of $G(X_C)$ or $X_{Ce}$, then there is incentive for contemporaneous forecasters to introduce bias into their forecasts.

Hence, a certain amount of judgement is needed to determine whether and under what circumstances this technique should be used. The technique should not be used if it is likely that $\tau_F < \tau_C$. For instance, if a future estimate of environmental damages is to be made only three weeks after the contemporaneous estimate, it is unlikely that $\tau_F > \tau_C$. On the other hand, if a future estimate of environmental damages is to be made several years after the contemporaneous estimate, it is more likely that $\tau_F > \tau_C$. The technique should be used only if sufficient time has elapsed for sufficient new information to come to the attention of forecasters, so that they are not unduly influenced in their predictions by the previous collective forecast.

A possible advantage of the future criterion estimate technique relative to the contemporaneous criterion estimate technique is that it encourages individual forecasters to collect or process additional information that other contemporaneous forecasters might not be collecting or processing. Such forecasters would have an incentive to set forth their evidence, analysis, or reasoning in ways that the future forecasters can agree to and accept as part of their future forecast. This incentive would be lacking if complete reliance were placed on the contemporaneous criterion estimate technique.

Use of a future criterion estimate has both advantages and disadvantages relative to use of a contemporaneous criterion estimate. It may well be that a combination of the two techniques in certain situations can bring forth some of the advantages without introducing significant disadvantages. Such a combination can be effectuated by paying forecasters partly based on the contemporaneous criterion estimate technique and partly based on the future criterion estimate technique. Alternatively, such a combination can be effectuated by computing the criterion value as a weighted average of a contemporaneous criterion estimate and a future criterion estimate.

Application 3: Estimating Corporate Profits

Stock traders implicitly evaluate corporate profits every time they buy and sell stocks. However, from society's point of view, the main reason for evaluating corporate profits is to ensure that corporate managers run their corporations efficiently. For this purpose, the main officers of a corporation and members of the board of directors should be compensated on the basis of long-run expected profitability. When managers know they will be judged mainly on long-term performance, they are dissuaded from taking actions which give a short-term appearance of increased profitability, but which actually harm profits in the long run.

Typically, managers will be rewarded less than a dollar for each dollar of additional profit which a firm earns. For instance, if a firm's profits vary by a billion dollars, the manager's income may vary by only a million dollars. This occurs because managers (like most people) are generally risk averse and also because they are generally unable to accept unlimited liabilities for potential losses. There are other important considerations in the choice of a managerial compensation function, but these need not concern us here. Let us assume that some managerial compensation function has been chosen, and consider the effects which the possible inaccuracy of forecasting corporate profits may have on the riskiness of managerial compensation.

Given the managerial compensation function, in which the size of payments are made contingent on estimated profits, and given a managerial utility function, we can estimate the size of any deadweight loss in mispredicting future profits. Obviously, if a prediction is perfectly accurate, there is no deadweight loss from the prediction itself. However, random errors in predicting corporate profits impose an extra gamble on managerial income which is avoided if prediction is perfectly accurate. If the manager were risk neutral in income, this extra gamble would impose no extra deadweight loss.

Suppose that forecasters, on the basis of information available to them, tend to predict that the value of a variable X (in this case, profits) will be around $X_f$. Since forecaster opinions differ, the various predictions of X are scattered around this central value of $X_f$. We can imagine that the prediction of each forecaster tends to fall about the mean $X_f$, plus or minus some deviation from $X_f$. If one could have an infinite number of forecasters, the mean prediction would be $X_f$. However, for any finite group of forecasters, the collective forecast $G(X_c)$ is randomly distributed around $X_f$. An increase in the number of forecasters allows for greater accuracy in observing $X_f$. The standard error of $G(X_c)$ around $X_f$ is therefore smaller when the forecasting group is larger.

Let $M(X)$ be managerial pay as a function of estimated profits. $M(X_f)$ is the managerial pay if $X_f$ is accurately predicted and similarly $U(M(X_f))$ is the managerial utility if $X_f$ is accurately predicted. Let e ($e=G(X_c)-X_f$) be the prediction error and let $g(e)$ be the probability density function of e. An ex ante expected deadweight loss may be estimated as $$\int_{-\infty}^{\infty} M(X_f+e)g(e)de - M^*, \qquad (36)$$

where $M^*$ solves $$U(M^*) = \int_{-\infty}^{\infty} U(M(X_f+e))g(e)de. \qquad (37)$$

Since the manager is rewarded on the basis of $G(X_c)$, the closer $G(X_c)$ approaches to $X_f$, the less deadweight loss which is incurred in paying a risk-averse manager. Although the value $X_f$ is never observed by the forecast requisitioner, the standard error of $(G(X_c)-X_f)$ is estimable by observing the standard deviation of the individual forecasts about the collective forecast $(X_i-G(X_c))$. Hence, the forecast requisitioner is able to estimate the optimal number of forecasters which are needed. Forecasters should be added to the forecasting group until the marginal cost of adding a forecaster equals the marginal benefit from reducing expected deadweight loss. Presumably, the optimal number of forecasters cannot be determined in advance for every single forecast, but experience with prior estimates will allow the forecast requisitioner to choose the optimal number of forecasters on average.

Since $X_f$ is never directly observed, individual forecasters cannot be rewarded on the basis of their marginal products, which would require knowing whether $X_i$ moves the collective prediction closer or further away from $X_f$ than the secondary collective prediction. Instead, let the criterion value, $X_a$, be the actual value of a future variable that forecasters were trying to predict. We may think of $X_f$ as being the best humanly possible prediction of $X_a$ at a given point in time. $X_a$ will differ from $X_f$ on account of new information received between the time the forecast was made and the time $X_a$ is observed. If the method of this application is to be used, forecasters must be judged on the basis of some arbitrary loss function relating $X_a$ to $G(X_c)$ and $G(X_{ci})$. Each forecaster is then paid on the basis of whether $X_i$ causes $G(X_c)$ to be closer or further away from $X_a$ than $G(X_{ci})$ in accordance with how this affects the arbitrary loss function. It is possible, if desired, that F and k may be chosen such that the average compensation of forecasters is set equal to the average marginal product of forecasters, though this is not essential to the method of this application.

Because a business corporation may live for a very long time, the ultimate long-run profitability of a corporation can never be precisely determined prior to its complete termination. One can only make estimates of its potential profitability, based on its past performance and other information. As time passes by, these estimates about profitability tend to get better and better, because more years of actual profitability have been observed and measured. Since it is quite possible that a forecaster may not live long enough to see whether his predictions about long-run profits ultimately proved correct, we must use some proxy for long-run profits as the criterion value and ask him to predict future values of that proxy.

A forecaster may be asked to predict, not long-run profits as such, but future predictions of long-run profits. For example, a forecaster might be asked to predict the discounted present value (DPV) of a criterion estimate of corporate equity value to be predicted five years hence, plus the DPV of dividends paid during the intervening five years, minus the DPV of new equity issued during the intervening five years. Alternatively, (if distinction between debt and equity payments is to be obliterated) the forecaster might be asked to predict the DPV of a criterion estimate of corporate profitability to be predicted five years hence, plus the DPV of operating profits earned during the intervening five years, minus the DPV of new capital investments during the intervening-five years.

We can imagine groups of forecasters making predictions about corporate profitability on a regular basis, with contingent compensation for each prediction being computed and paid five years after each prediction is made. This can result in long chains of predictions about predictions about predictions about predictions which can be extended indefinitely far into the future. Since the rewards of each forecaster are based on future collective predictions, conflict of interest considerations suggest that no forecaster should be asked to make any prediction upon which compensation for previous predictions would be based. Hence, there should be constant turnover of forecasters such that no forecaster is placed in such a position of conflicting interests concerning his incentives for accurate prediction.

Unlike the stock market, whose predictions are confined solely to estimating profitability of corporate stock, the method of this application may be used to elicit many types of information about a corporation. One may solicit predictions concerning corporate profits, sales, outputs, costs, employment, investment, or any other matter for which information is desirable. One may solicit such information, not merely about the corporation as a whole, but about the different plants, industries, lines of business, markets, or geographical regions in which the firm is operating. Obviously, the more information which is requested, the more effort which forecasters must exert, and the more money which must be paid to compensate for that effort. Highly detailed information might or might not be desirable, given its extra cost.

One application for which the elicitation of somewhat detailed information is desirable is in the calculation of relative profits (profits relative to an average level of profits for firms in a particular group of firms in the same market or industry). A formula for calculating relative profit for firm i ($G_i$) is as follows:

$$G_i = \pi_i - \Sigma w_j \pi_j, \text{ all } j, \text{ where } \Sigma w_j = 1, j \neq i, \text{ and } \pi_i = \text{absolute profit of firm i.} \quad (38)$$

In order to prevent collusion, it may be desirable that firm managers be rewarded in accordance with relative profits rather than absolute profits. This requires some calculation of profits of a firm in each industry it does business in, and comparing these profits with an industry average. If every firm did business in only one industry, such a calculation would present little problem, but some firms are conglomerates doing business in several industries. Looking at stock prices only will not provide us with such disaggregated information about expected profits in each industry. The method of the present application, however, does allow us to solicit this type of information about current and expected future profits of a firm in each industry it does business in.

Compared with the stock market, the method of this application can be a highly efficient method of predicting corporate profits. This is so for several reasons. First, the implied prediction of the stock market is biased downwards because of investor risk aversion, whereas the present method is unbiased. Second, in the stock market there can be too much information gathering for private trading purposes relative to the value of such information in accurately rewarding corporate management. Third, such information as is gathered by the stock market is inefficiently aggregated, since it places no weight on the opinions of those traders who refuse to buy a stock because they believe it is overpriced. The present invention allows every forecaster's opinion to have at least some weight in a group prediction: no opinion need be arbitrarily ignored.

Preventing Easy Collusion

The invention as set forth above is potentially susceptible to a problem of "easy collusion." This is because the set of incentives set forth above makes it profitable for any two forecasters to come to a collusive agreement to submit biased forecasts to the forecast requisitioner. The collusion is "easy" because only two forecasters need agree, even if several forecasters have been hired, and because such an agreement is self-enforcing in the sense that once agreed to, the forecasters have no incentive to cheat on the agreement. Certain modifications to the invention can eliminate these "easy" or self-enforcing incentives for collusion, and indeed can even eliminate entirely any incentive for pair-wise collusion.

When a contemporaneous criterion estimate is not being used as the criterion value, easy pair-wise collusion can occur if two forecasters agree to bias their forecasts in an equal but opposite manner. Thus, letting B be the agreed-upon bias, and letting $Z_i$ and $Z_j$ be the truthful predictions, forecasters i and j can come to the following agreement: Forecaster i submits $X_i = Z_i + B/\tau_i$ and $T_i = \tau_i$. Forecaster j submits $X_j = Z_j - B/\tau_j$ and $T_j = \tau_j$. As a result of this agreement, the collective prediction, $G(X_c) = \Sigma T_i X_i / T_c$, remains unchanged, but the expected pay of the colluders goes up.

This potential for collusion can be dealt with in a number of ways. First, one can apply traditional antitrust laws by threatening to punish any forecaster who colludes. Second, one may attempt to keep the identities of forecasters secret from one another until after forecasts are issued. Third, one can modify the forecasting incentive scheme to increase the incentive to cheat or even eliminate entirely the incentive for two forecasters to collude. This latter can be accomplished by compensating forecasters based on collective predictions and secondary collective predictions which are derived from only a subset of the solicited forecasters.

For forecaster i, let p be the probability that colluding forecaster j is a member of the subset upon which compensation for colluding forecaster i is being computed. On the assumption that the loss function takes the quadratic form, $L(X_a, G(X_c)) = (X_a - G(X_c))^2$, and that $k=1$ in equation (6), the incentive to collude is:

$$B^2[p/\tau_{ci}^2 - (1-p)/\tau_c^2] \quad (39)$$

The incentive to cheat is:

$$B^2(1-p)^2/\tau_c^2 \quad (40)$$

If $p=1$, there is no incentive to cheat. If $p \leq \tau_{ci}^2/(\tau_c^2 + \tau_{ci}^2)$, there is no incentive for pair-wise collusion. If $p > \tau_{ci}^2/(\tau_c^2 + \tau_{ci}^2)$, then the ratio of the incentive to cheat over the incentive to collude is:

$$(1-p)^2/[p\tau_c^2/\tau_{ci}^2-(1-p)] \tag{41}$$

Suppose our goal is to eliminate entirely the incentive for pair-wise collusion. Let n be the number of forecasters in the subset ($n \geq 2$). This subset includes forecaster i. Let N be the total number of solicited forecasts. If we assume that all submitted precision weights ($T_i$) are of approximately equal size, and if we further assume that each forecaster j has an equal probability of being selected to the subset, $p=(n-1)/(N-1)$, then for any given $n \geq 2$ it is required that $N \geq 2n+2$. Alternatively, for any $N \geq 6$, it is allowable for $n \leq N/2-1$.

When forecasters are risk averse, this technique of using subsets of forecasters to determine forecaster compensation can be applied several different times using several different groupings of forecasters. An average of the compensation computed under each calculation can then be used to calculate the actual compensation to the particular forecaster. For example, if there are ten forecasters, the nine forecasters other than i plus forecaster i can be grouped into subsets of four forecasters in as many as 84 (9×S×7/3!) different ways. Computing an average of compensation reduces the variance of compensation, and would therefore be beneficial in reducing the risk premia which forecasters would demand in order to enter the forecasting task.

When forecasters are being compensated on the basis of a contemporaneous criterion estimate, easy pair-wise collusion can occur in either of two ways. If two colluders expect to be in the same subset, they can agree to bias their forecasts in an equal but opposite manner. If two colluders expect to be in opposite subsets, they can agree to bias their forecasts equally in the same direction. Of course, there is no reason why the forecast requisitioner need tell potential colluders in advance which subsets they will be assigned to.

For forecaster i, let p be the probability that colluding forecaster j is a member of the same subset as forecaster i, and let (1-p) be the probability that colluding forecaster j is a member of the opposite subset as forecaster i. Let $B_i$ and $B_j$ be the biases introduced into each forecaster's prediction (conditional on some finite T), and let $C_i$ and $C_j$ be the biases introduced into each forecaster's criterion prediction (prediction conditional on $T=\infty$ or T very large). We assume initially that colluding forecasters can submit prediction functions in such a manner that the C biases can be set independently of the B biases.

If colluding forecasters agree on biases in the opposite direction, then $B_i=-B_j=B$ and $C_i=-C_j=cB$, where $c<0$. On the assumption that the loss function takes the quadratic form, $L(X_a,G(X_c))=(X_a-G(X_c))^2$, and that $k=1$ in equation (6), then collusion will be self-enforcing if $C=-(\tau_B/\tau_A)$. The incentive to collude is:

$$pB^2/\tau_{Ai}^2-(1-p)B^2/\tau_A^2-2(1-p)cB^2/(\tau_A\tau_B) \tag{42}$$

There is no incentive to collude in the opposite direction if:

$$c>(\tau_B/\tau_A)[p(\tau_A^2/\tau_{Ai}^2)-(1-p)]/(2-2p) \tag{43}$$

If colluding forecasters agree on biases in the same direction, then $B_i=B_j=B$ and $C_i=C_j=cB$, where $C>0$. On the assumption that the loss function takes the quadratic form, $L(X_a,G(X_c))=(X_a-G(X_c))^2$, and that $k=1$ in equation (6), then collusion will be self-enforcing if $C=[(1+p)/(1-p)](\tau_B/\tau_A)$. The incentive to collude is:

$$pB^2/\tau_{Ai}^2-(1+3p)B^2/\tau_A^2+2(1-p)cB^2/(\tau_A\tau_B) \tag{44}$$

There is no incentive to collude in the same direction if:

$$c<(\tau_B/\tau_A)[1+3p-p(\tau_A^2/\tau_{Ai}^2)]/(2-2p) \tag{45}$$

The forecast requisitioner can entirely prevent incentives for pair-wise collusion by enforcing a stable relationship between ordinary predictions and criterion predictions such that c necessarily falls between the values shown in the inequalities (43) and (45). For example, one could run a weighted least squares regression to determine a linear relationship between the criterion predictions ($X_{ie}$) and the ordinary predictions ($X_i$) of each forecaster: $X_{ie}=\alpha+\beta X_i$.

If the computed value of B is an acceptable value for c as indicated by inequalities (39) and (41) and other considerations, then one may substitute $\alpha+\beta X_i$ as the criterion prediction for each forecaster, prior to computing the criterion estimates. If the computed value of B is not an acceptable value for c, then one may substitute an acceptable value of c for $\beta$ and compute $\alpha$ as a weighted average of $X_{ie}-\beta X_i$, then substitute $\alpha+\beta X_i$ as the criterion prediction for each forecaster, prior to computing the criterion estimates. This procedure of enforcing a stable relationship between ordinary predictions and criterion predictions has the effect of preventing colluding forecasters from submitting prediction functions in such a manner that the C biases can be set independently of the B biases. Other computational methods for achieving the same effect are easily imagined.

Let n be the number of forecasters in the subset of forecasters which includes forecaster i and let N be the total number of solicited forecasts. Assume that all submitted precision weights ($T_i$) are of approximately equal size and that each forecaster j has an equal probability of being selected to the subset containing forecaster i: $p=(n-1)/(N-1)$. Suppose our goal is to eliminate entirely the incentive for pair-wise collusion, when the contemporaneous criterion estimate technique is being used. We ordinarily want $c \geq 1$, but less than the value indicated in inequality (45). This is possible, provided $n \geq 2$ and $N \geq 6$.

While the above description constitutes the preferred embodiments of the present invention, it will be appreciated that the invention is susceptible to modification, variation and change without departing from the proper scope and fair meaning of the accompanying claims.

I claim:

1. A method of soliciting unbiased forecasts of an unknown variable value from an individual forecaster and from one or more secondary forecasters, which for said individual forecaster the method comprises the steps of:

a) soliciting a prediction of said unknown variable value from said individual forecaster;

b) soliciting predictions of said unknown variable value from said secondary forecasters;

c) aggregating the predictions of said individual forecaster and said secondary forecasters using a first aggregator function to obtain a collective prediction;

d) aggregating the predictions of said secondary forecasters using a second aggregator function to obtain a secondary collective prediction;

e) observing a criterion value for said unknown variable value being predicted;

f) computing a collective loss using a loss function having said criterion value and said collective prediction as arguments of said loss function;

g) computing a secondary collective loss using said loss function with said criterion value and said secondary collective prediction as arguments of said loss function;

h) computing said individual forecaster's marginal contribution by subtracting the collective loss from the secondary collective loss;

i) computing said individual forecaster's compensation amount as a monotonic transformation of said forecaster's marginal contribution; and j) paying said individual forecaster compensation equal to the value of said individual forecaster's compensation amount.

2. A method according to claim 1 in which said compensation consists of statutory compensation.

3. A method according to claim 1 in which said compensation consists of manufactured money.

4. A method according to claim 1 in which said loss function is nonquadratic.

5. A method according to claim 1 in which said second aggregator function is a secondary aggregator function of said first aggregator function.

6. A method according to claim 1 in which said criterion value is a future observation of the actual value of said predicted unknown variable value.

7. A method according to claim 1 in which at least one of said secondary forecaster predictions was not solicited in accordance with the method of the present invention.

8. A method according to claim 1 in which said unknown variable value is the probability of an event.

9. A method according to claim 1 in which said unknown variable value is the price of a commodity.

10. A method according to claim 1 in which said unknown variable value is a corporate profit.

11. A method according to claim 1 in which said unknown variable value is a relative profit.

12. A method according to claim 1 in which said unknown variable value is a quantity of pollutant.

13. A method according to claim 1 in which said unknown variable value is a damage estimate.

14. A method according to claim 1 in which said unknown variable value is an observation of a state of nature.

15. A method according to claim 1 in which Steps a), b), c), and d) comprise the substeps of:
   i) soliciting a precision weight from said individual forecaster;
   ii) soliciting a prediction function from said individual forecaster, said prediction function having an aggregate precision weight as one of its arguments;
   iii) soliciting precision weights from said secondary forecasters;
   iv) soliciting prediction functions from said secondary forecasters, each of said prediction functions having an aggregate precision weight as one of their arguments;
   v) aggregating the precision weights of said individual forecaster and said secondary forecasters to obtain a collective precision weight;
   vi) selecting definite predictions of said individual forecaster and said secondary forecasters by using said collective precision weight as an argument of each of said prediction functions of said individual forecaster and said secondary forecasters;
   vii) weighting said definite predictions using said precision weights;
   viii) aggregating said weighted definite predictions using said first aggregator function to obtain a collective prediction;
   ix) aggregating the precision weights of said secondary forecasters to obtain a secondary collective precision weight;
   x) selecting secondary definite predictions of said secondary forecasters by using said secondary collective precision weight as an argument of each of said prediction functions of said secondary forecasters;
   xi) weighting said secondary definite predictions using said precision weights;
   xii) aggregating said weighted secondary definite predictions using said second aggregator function to obtain a secondary collective prediction.

16. A method according to claim 1 in which said criterion value is determined from at least one criterion estimate.

17. A method according to claim 11 in which the determination of said criterion estimate comprises the substeps of:
   i) soliciting precision weights from one or more tertiary forecasters;
   ii) soliciting prediction functions from said tertiary forecasters, each of said prediction functions having an aggregate precision weight as one of their arguments;
   iii) selecting criterion predictions of said tertiary forecasters by substituting infinity for said aggregate precision weight as said argument of each of said prediction functions of said tertiary forecasters;
   iv) weighting said criterion predictions using said precision weights;
   v) aggregating said weighted criterion predictions using a third aggregator function to obtain said criterion estimate.

18. A method according to claim 16 in which the determination of said criterion estimate comprises the substeps of:
   i) soliciting precision weights from one or more tertiary forecasters;
   ii) soliciting prediction functions from said tertiary forecasters, each of said prediction functions having an aggregate precision weight as one of their arguments;
   iii) selecting tertiary definite predictions of said tertiary forecasters by using a finite aggregate precision weight as said argument of each of said prediction functions of said tertiary forecasters;
   iv) selecting criterion predictions of said tertiary forecasters by substituting infinity for said aggregate precision weight as said argument of each of said prediction functions of said tertiary forecasters;
   v) ascertaining a typical functional relationship between said criterion predictions and said tertiary definite predictions;
   vi) if said typical functional relationship does not fall within an acceptable range that would tend to inhibit collusion, then substituting a more acceptable functional relationship to be used as said typical functional relationship;
   vii) computing substitute criterion predictions using said tertiary definite predictions as arguments of said typical functional relationship;
   viii) weighting said substitute criterion predictions using said precision weights;
   ix) aggregating said weighted substitute criterion predictions using a third aggregator function to obtain said criterion estimate.

19. A method of soliciting unbiased forecasts of an unknown variable value from an individual forecaster and from one or more secondary forecasters, which for said individual forecaster the method comprises the steps of:
   a) soliciting a prediction of said unknown variable value from said individual forecaster;
   b) soliciting criterion predictions of said unknown variable value from said secondary forecasters;
   c) aggregating the criterion predictions of said secondary forecasters using an aggregator function to obtain a criterion estimate of said unknown variable value being predicted;

d) computing a collective loss using a loss function having said criterion estimate and said individual prediction as arguments of said loss function;

e) computing said individual forecaster's marginal contribution by subtracting said collective loss from a fixed constant;

f) computing said individual forecaster's compensation amount as a monotonic transformation of said forecaster's marginal contribution; and g) paying said individual forecaster compensation equal to the value of said individual forecaster's compensation amount.

20. A method of soliciting unbiased forecasts of an unknown variable value from an individual forecaster and from one or more secondary forecasters, which for said individual forecaster the method comprises the steps of:

a) announcing a preliminary prediction of said unknown variable value;

b) soliciting a prediction of said unknown variable value from said individual forecaster;

c) soliciting criterion predictions of said unknown variable value from said secondary forecasters;

d) aggregating the criterion predictions of said secondary forecasters using an aggregator function to obtain a criterion estimate of said unknown variable value being predicted;

e) computing a collective loss using a loss function having said criterion estimate and said individual prediction as arguments of said loss function;

f) computing a secondary collective loss using said loss function with said criterion estimate and said preliminary prediction as arguments of said loss function;

g) computing said individual forecaster's marginal contribution by subtracting said collective loss from a fixed constant and adding said secondary collective loss multiplied by a nonzero constant;

h) computing said individual forecaster's compensation amount as a monotonic transformation of said forecaster's marginal contribution; and i) paying said individual forecaster compensation equal to the value of said individual forecaster's compensation amount.

21. A method according to claim 20 in which said nonzero constant is one.

* * * * *